UNITED STATES PATENT OFFICE.

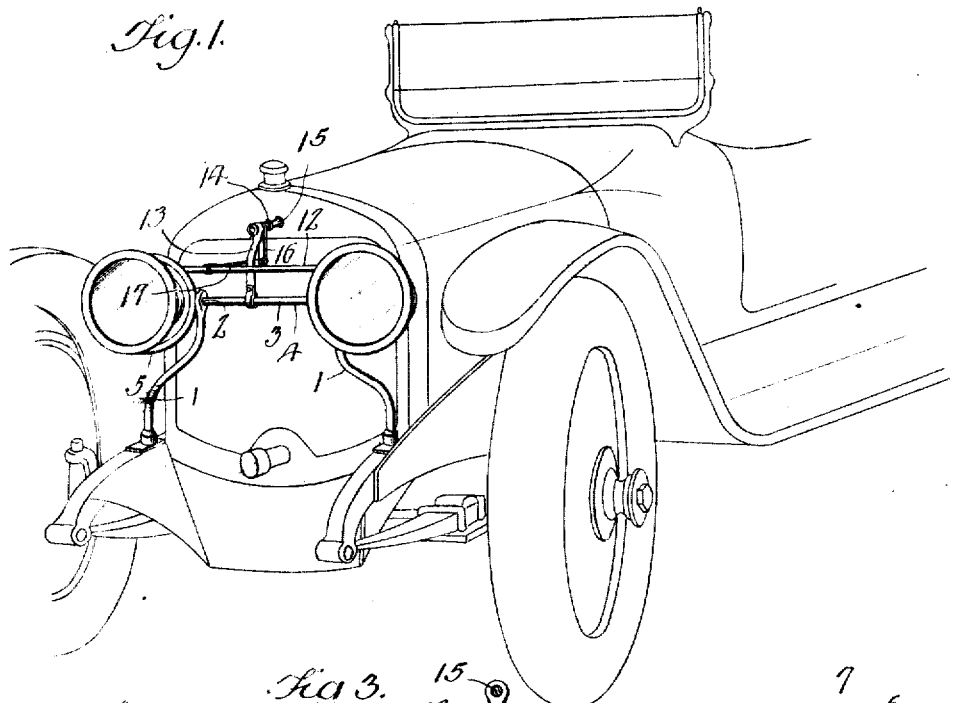

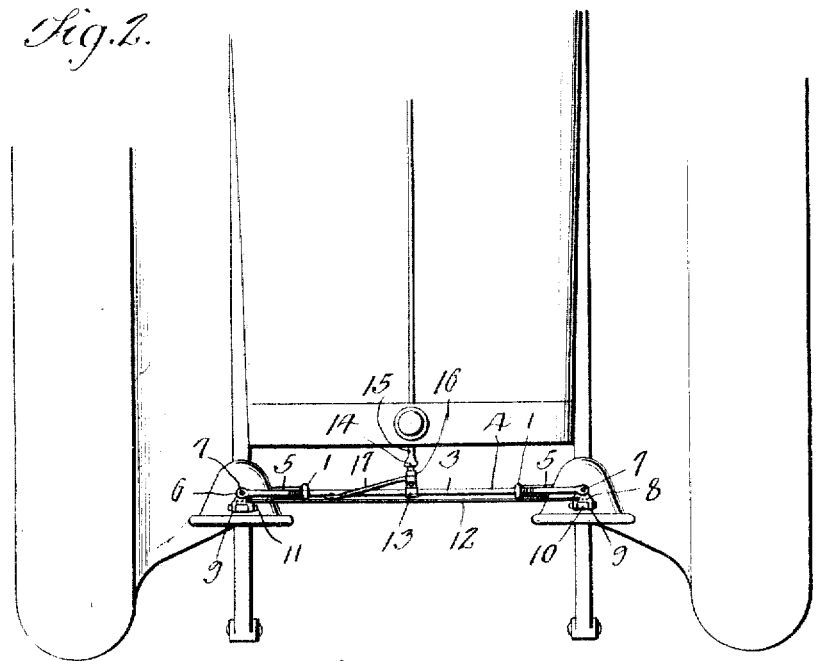
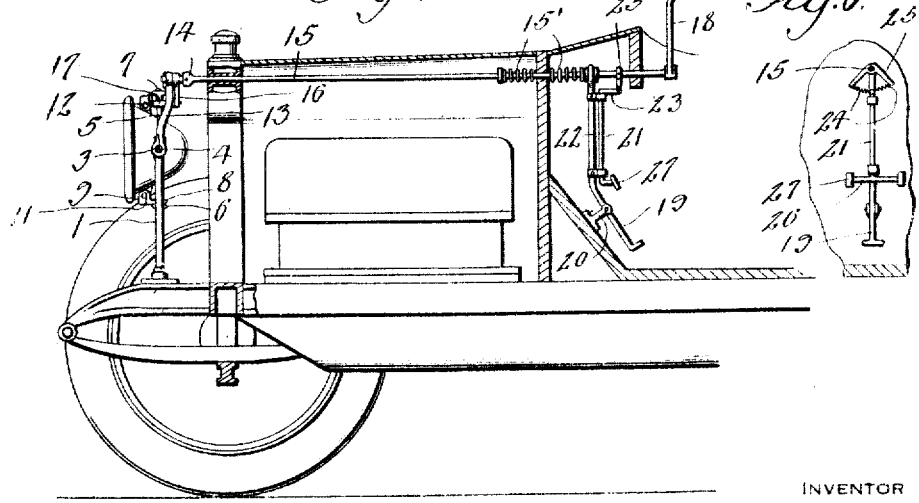
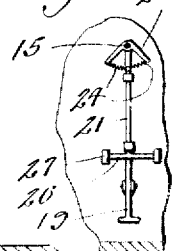

JAY D. SLIPHER, OF FRANKFORT, INDIANA.

HEADLIGHT CONTROL.

1,272,133.

Specification of Letters Patent.

Patented July 9, 1918.

Application filed April 3, 1917. Serial No. 159,518.

*To all whom it may concern:*

Be it known that I, JAY D. SLIPHER, a citizen of the United States, residing at Frankfort, in the county of Clinton and State of Indiana, have invented new and useful Improvements in Headlight Controls, of which the following is a specification.

This invention relates to vehicle head lights and has for one of its objects, the provision of a manually operated head light control for simultaneously adjusting head lights of a vehicle in vertical and horizontal planes.

The invention aims to provide a head light control including a double lamp bracket rotatable in a horizontal plane to lower or elevate the light rays, a tie rod connecting the lamps for swinging them about vertical pivots and means for shifting the tie rod longitudinally and rotating the bracket.

The invention also aims to generally improve head light mechanism of this nature to render it more practical, useful and commercially desirable.

With these and other objects in view as will become more apparent as the description proceeds, the invention consists in certain novel features of construction, combination and arrangement of parts as will be hereinafter fully described, illustrated and claimed.

In the drawings,

Figure 1 is a perspective view of a vehicle showing the application of my invention thereto.

Fig. 2 is a top plan view showing the head light mechanism attached to a vehicle.

Fig. 3 is a rear elevation of the head light control, and

Fig. 4 is a detail view of a part to be hereinafter described.

Fig. 5 is an elevation with parts broken away showing my invention thereon.

Fig. 6 is a detail of the operating mechanism.

Referring in detail to the drawings by numerals, 1, 1 designates stationary lamp posts having transverse openings 2 in their upper ends through which extends a shaft 3 of the double lamp bracket, generally designated 4. A yoke having arms 5 is formed on each end of the bracket shaft 3. The ends of the yoke arms are enlarged as indicated at 6 and pivotally connected by means of bolts 7 to plates or hinges 8 which are provided on one side of their pivot connections with depending ears 9. These ears are connected to the lamp lugs 10 by bolts 11.

An adjusting or tie rod 12 is pivotally connected at its ends to a pair of the hinge plates 8, eccentric with their pivot point so that when the rod is shifted longitudinally, it will swing the lamps on a vertical axis.

A lever 13 is connected to and extends upwardly from the shaft 3 of the lamp bracket 4 and is connected adjacent its upper end with a universal joint 14 to a main control rod 15 which extends rearwardly into easy reach of the driver of the vehicle. The springs 15' which encircle the rod 15 as shown serve to automatically center or return the rod to neutral position when pressure thereon is released. Connected to the main control rod is a link or lever 16 which is connected to a link or lever 17 secured to the tie rod 12. When the main control rod 15 is rotated, it will move longitudinally through the medium of the arms 16, 17, the tie rod 12 and when the main control rod is moved longitudinally it will swing the arm or lever 13 to rotate the lamp brackets.

An arm 18 is fixed to the inner end of the control rod 15 to facilitate the rotation thereof by hand. This arm is also useful to move the rod 15 longitudinally. The rod may also be moved longitudinally by the foot lever 19 pivoted to a bracket 20. The lever is engaged at its upper end with a rod by being forked to embrace the same as shown. To rotate the rod by foot pressure, I provide a shaft 21 journaled to the upstanding portion 22 of the foot lever 19. This shaft is bent at right angles at its upper end to provide an inwardly extending arm 23 which is connected to a pair of springs 24. These springs are secured at their outer ends to the depending and diverging arms 25 fixed to the rod. The lower end of the shaft is extended rearwardly and has secured to its terminal a cross bar 26 with foot pedals 27 on each end thereof. When one or the other of the pedals 27 is pressed the rod 21 will be turned so as to exert a downward pull on one of the arms 25 to rotate the rod as will be clearly understood.

From the foregoing description taken in connection with the accompanying drawings, it will be seen that I have provided a simple and practical head light control which by means of a main control rod may be actuated to swing the head lights on a vertical and horizontal axis.

While I have shown and described the preferred embodiments of my invention, it will be clearly understood that I do not wish to be limited to this construction, but may make such changes as will fall within the scope and spirit of the invention as claimed.

What I claim is:—

A head light control comprising a pair of lamp posts, a horizontal shaft journaled therein and having yokes at its ends, a pair of lamps, a pair of plates hinged to each lamp, means for pivoting each pair of plates to the ends of each yoke, a rod connecting one plate of each pair together, a bar having longitudinal and rotary movement, a link connecting the end of said bar with the horizontal shaft to rotate the same, and a pair of links connecting said bar with the rod connected to the plates for moving the same horizontally on the rotation of said bar.

In testimony whereof I affix my signature.

JAY D. SLIPHER.